United States Patent
Alsewailem

(10) Patent No.: US 8,545,748 B2
(45) Date of Patent: Oct. 1, 2013

(54) BUILDING BRICKS INCLUDING PLASTICS

(75) Inventor: Fares D. Alsewailem, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 243 days.

(21) Appl. No.: 12/868,304

(22) Filed: Aug. 25, 2010

(65) Prior Publication Data

US 2012/0047833 A1    Mar. 1, 2012

(51) Int. Cl.
  *C04B 28/02* (2006.01)
  *C04B 35/622* (2006.01)
  *C08J 5/00* (2006.01)

(52) U.S. Cl.
  USPC ............ 264/331.13; 264/331.11; 264/319; 106/713; 106/644

(58) Field of Classification Search
  USPC ............ 52/309.17, 596, 612; 264/331.11, 264/331.13, 336, 109; 106/713, 644; 427/213.3, 353
  See application file for complete search history.

(56) References Cited

U.S. PATENT DOCUMENTS

| | | | | |
|---|---|---|---|---|
| 2,456,207 A | | 12/1948 | McCoy | |
| 3,257,338 A | * | 6/1966 | Sefton | 521/54 |
| 3,864,443 A | * | 2/1975 | Hopkins | 264/42 |
| 4,013,616 A | * | 3/1977 | Wallace | 521/47 |
| 4,177,079 A | | 12/1979 | Espenscheid | |
| 4,238,242 A | * | 12/1980 | Park | 523/204 |
| 4,266,921 A | * | 5/1981 | Murray | 425/158 |
| 4,595,710 A | * | 6/1986 | Albertelli et al. | 521/100 |
| 4,843,103 A | * | 6/1989 | Albertelli et al. | 521/83 |
| 5,169,588 A | | 12/1992 | Estepp | |
| 5,178,941 A | * | 1/1993 | Wu | 428/309.9 |
| 5,468,539 A | * | 11/1995 | Crivelli | 428/141 |
| 5,482,550 A | * | 1/1996 | Strait | 106/677 |
| 5,580,378 A | * | 12/1996 | Shulman | 106/677 |
| 5,730,922 A | * | 3/1998 | Babb et al. | 264/258 |
| 5,755,216 A | * | 5/1998 | Salyer | 126/618 |
| 6,034,155 A | * | 3/2000 | Espeland et al. | 523/220 |
| 6,444,073 B1 | * | 9/2002 | Reeves et al. | 156/211 |
| 6,669,773 B2 | | 12/2003 | Malloy et al. | |
| 7,699,929 B2 | * | 4/2010 | Guevara et al. | 106/724 |
| 7,744,692 B2 | * | 6/2010 | Guevara et al. | 106/727 |
| 2008/0168927 A1 | * | 7/2008 | Roberts | 106/731 |
| 2010/0140837 A1 | * | 6/2010 | Biebaut et al. | 264/267 |

FOREIGN PATENT DOCUMENTS

AR   047617   2/2006

OTHER PUBLICATIONS

K.S. Rebeiz, "Time-Temperature Properties of Polymer Concrete Using Recycled PET", Cement and Concrete Composites 17, 1995, pp. 119-124.

(Continued)

*Primary Examiner* — Phi A

(74) *Attorney, Agent, or Firm* — Andrew M. Calderon; Roberts Mlotkowski Safran & Cole, P.C.

(57) ABSTRACT

A brick comprises a thermoplastic material, such as high density polyethylene (HDPE), and a cement-containing material. The brick may be made by mixing thermoplastic material and dry, uncured cement-containing material. This mixture is placed in a mold. The mold is heated while the mixture is compressed to melt or soften the thermoplastic material and to bind the particulate material in the mold into the shape of a brick. After the hardened brick is removed from the mold, the surface of the brick may be sprayed with water to cure cement-containing material on the surface of the brick.

19 Claims, 2 Drawing Sheets

(56) References Cited

OTHER PUBLICATIONS

Rebeiz, "Strength and durability properties of polyester concrete using pet and fly ash wastes", Advanced Performance Materials, vol. 3, Issue 2, Apr. 1996, Abstract. URL: http://www.scopus.com/record/display.url?eid=2-s2.0-0030129133&origin=inward&txGid. (Downloaded Aug. 10, 2010).

Gaggino et al., "Procedure for making a cement mixture with recycled plastics applicable to the manufacture of building elements", Recent Patents on Materials Science, vol. 3, Issue 2, Jun. 2010, Abstract. URL: http://www.scopus.com/record/display.url?eid=2-s2.0-77951552866&origin=inward&txGid. (Downloaded Aug. 10, 2010).

Boutemeur et al., "Investigation of the use of waste plastic as aggregate for concrete", Proceedings of the International Conference on Sustainable Waste Management and Recycling: Construction Demolition Waste, 2004, Abstract. URL: http://www.scopus.com/record/display.url?eid=2-s2.0-33644963634&origin=inward&txGid. (Downloaded Aug. 10, 2010).

Garas et al., "Review of Polymer Concrete Properties", 3 pages.

Rebeiz, "Time-temperature properties of polymer concrete using recycled PET", Cement and Concrete Composites, vol. 17, Issue 2, 1995, Abstract. URL: http://www.scopus.com/record/display.url?eid=2-s2.0-0029234481&origin=inward&txGid. (Downloaded Aug. 10, 2010).

\* cited by examiner

BUILDING BRICKS INCLUDING PLASTICS

FIELD OF THE INVENTION

The invention relates to a brick comprising a thermoplastic material, such as high density polyethylene (HDPE), and a cement-containing material and, more particularly, to a method for preparing a unique form of brick comprising a thermoplastic material and a cement-containing material.

BACKGROUND OF THE INVENTION

Bricks have been made from clay or from concrete. A brick made from clay may be made by molding a clay containing material into the shape of a brick having sufficient green strength to be capable of being removed from a mold. The green strength of the molded, brick-shaped clay is also sufficient to allow the molded clay to hold its shape during subsequent handling and treatment after being removed from the mold. The molded, brick-shaped clay is then placed in a kiln and heated to extremely high temperatures to harden the clay into a brick of sufficient strength to be used as a building material.

A brick made from concrete may be made by an entirely different process. The formation of concrete requires two components, i.e. a cement composition and water. A dry cement composition typically includes a mixture of a powdery, dry cement and a filler, such as sand and gravel. The dry cement composition may be combined with water to form a pourable aqueous mixture of water and solid. This pourable mixture may be poured into a mold. In the mold, the cement composition hardens to form a concrete brick material. When the concrete brick material is sufficiently cured to be removed from the mold, while retaining its shape, it may be removed from the mold and may continue to harden over time. The hardening or curing of the cement into concrete takes place by virtue of a chemical reaction of the cement with water, and this curing may take place under ambient conditions without heating of the material. Bricks formed from cement have a disadvantage in that, for example, they tend to be heavy, brittle and lack thermal insulation properties.

Handling of cement in large quantities, particularly in brick formation, also has an environmental disadvantage, in terms of generation of solid fines in the air. In particular, cement includes solid fines, which can be caught up in the air when the cement is moved or handled in the open atmosphere. The amount of fines introduced into the atmosphere is proportional to the amount of cement which is processed.

As noted above, in addition to environmental concerns attributed to the generation of atmospheric fines, manufacture of bricks from cement tends to produce heavy bricks. In order to reduce the weight of bricks, light weight plastic material has been used as a filler in the cement composition used to form the bricks.

The Shulman U.S. Pat. No. 5,580,378 describes a dry, cement-containing composition including, for example, fly ash, Portland cement, sand, lime and a weight saving component, which is micronized (e.g., very small particle size) polystyrene. The dry cement-containing composition may be mixed with water, placed in a mold as a liquid cement and used to make bricks. In this molding process, no heat or pressure to compress the molded cement is needed or desired.

The Malloy et al U.S. Pat. No. 6,669,773 describes a cement-containing composition including Portland cement. A blend of fly ash with at least two plastic materials is included as a filler or "aggregate," for the cement-containing composition. Examples of the plastic used in the blend include polyethylene terephthalate (PET) and high density polyethylene (HDPE). The cement-containing composition may be mixed with water, placed in a mold as a liquid cement and used to make bricks. In this molding process, no heat or pressure to compress the molded cement is needed or desired.

With the increase in the amount of plastic waste produced on a daily basis, modern communities need to provide practical and strategic ways to recycle such materials. There are several methods for dealing with plastic waste. One method involves a chemical recycle process to produce valuable gasses and liquid hydrocarbons. However, in order to achieve this goal, chemicals and special equipment have to be used, which make chemical recycling not desirable. Physical or material recycling, where plastic waste is re-melted and pelletized, offers a cost-effective method to make use of waste plastic. However, care needs to be taken to make sure that impurities are not present in the articles being recycled. Another drawback related to material recycling is that the application for the recycled articles has to be for the long term. Otherwise, plastic waste will need to be recycled again. For example, PET from bottles may be recycled to produce further PET bottles, but this short term type of recycling tends to generate further waste PET at the same rate that it is recycled.

High density polyethylene (HDPE) is a very common plastic used in making containers, such as milk jugs, shampoo bottles, water jugs, juice containers and soft drink bottles. There is a particular need to recycle post consumer HDPE from such discarded containers.

SUMMARY OF THE INVENTION

In a first embodiment, the invention is directed to a building brick. The building brick includes a cement-containing material bound in a matrix of a thermoplastic material. The brick may include at least 35 weight % (wt %) of a thermoplastic material, such as HDPE. The brick may also includes least 20 wt % of the cement-containing material, at least a portion of which may be in an uncured state. Internal regions of the brick may comprise unhardened cement-containing material which has not been hardened by reaction with water. However, the surface of the brick may comprise hardened cement-containing material (i.e. concrete) which has been hardened by reaction with water.

In another embodiment, the invention is directed to a method for preparing a brick. The method includes the step of preparing a mixture of a dry, uncured, cement-containing material and a thermoplastic material. The mixture is then placed in a mold. Pressure is then applied to the mold to compress the mixture, while the temperature of the mixture is maintained at a temperature sufficient to melt or soften the plastic material and bind the cement-containing mixture in a matrix of plastic material in the form of a brick. The brick is then removed from the mold. After the brick is removed from the mold, the surface of the brick may be contacted with water to cure cement on the surface of the brick.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION OF THE INVENTION

Figure 1:
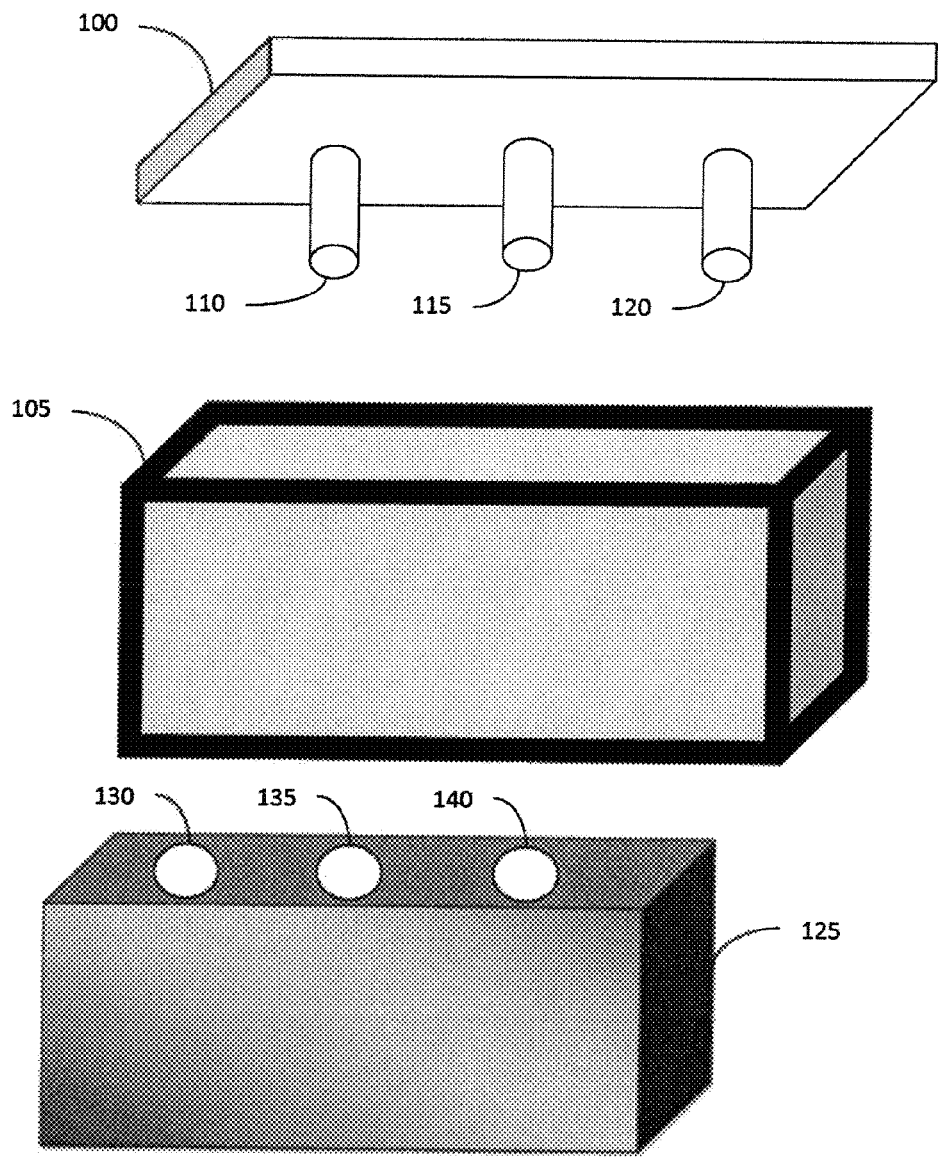
FIG. 1 shows a mold body, a mold cover and a brick made with the mold.

The invention relates to a brick comprising a thermoplastic material, such as high density polyethylene (HDPE), and a cement-containing material and, more particularly, to a method for preparing a unique form of brick comprising a thermoplastic material and a cement-containing material. The invention relates to a plastic-containing brick and a method for its manufacture.

As noted in the Background section above, post-consumer plastics, not limited to HDPE, have been blended with cement and water and used to make molded articles. No melt or hot press is used.

According to embodiments described herein, bricks are prepared with a hot press (i.e. melt process). A thermoplastic material, such as HDPE, is mixed with a dry, uncured, cement-containing material, and the mixture is compressed and heated to melt or soften the thermoplastic material and to create a great degree of adhesion between plastic and the other components, such as cement and filler, introduced into the mold.

The hot press method for making bricks makes use of a larger percentage of light weight plastic material to be mixed with a cement-containing material. Conventional bricks without plastic material and prepared from a cement-containing material tend to be heavy. Also, insofar as these conventional bricks may shatter, when subjected to relatively small impacts, they tend to be brittle. The plastic-containing bricks of the present invention have light weight. These plastic-containing bricks are less dense than bricks made of 100% concrete. The plastic-containing bricks of the present invention are tough. These plastic-containing bricks, especially those made with HDPE, may be less brittle than bricks made of 100% concrete. The plastic-containing bricks of the present invention are good thermal insulators. These plastic-containing bricks tend to have less thermal conductivity than bricks made of 100% concrete.

Since a smaller amount of cement-containing material is used per each brick produced, the present hot press method for producing bricks has the environmental advantage in that the amount of solid fines from a cement-containing material introduced into the atmosphere is lessened, as compared to a process where bricks are prepared from 100% concrete.

Another environmentally advantageous property of the present bricks is that they may be recycled. For example, used plastic-containing bricks may be ground into aggregate size particles, and these particles may be used as aggregates for preparing cement-containing compositions, which, in turn, may be used, for example, to prepare new bricks.

The plastic-containing bricks generally have a suitable aesthetic appearance and need not be painted. The present bricks may comprise at least 35 wt % of thermoplastic material. For example, these bricks may comprise from 35 to 80 wt % of thermoplastic material.

The present bricks may comprise at least 20 wt % of a cement-containing material. For example, these bricks may comprise from 20 to 65 wt % of a cement-containing material.

The term "cement-containing material" refers to any of a number of compositions comprising a cement material, and one or more fillers or adjuvants. An uncured, cement-containing material, upon addition of water, forms a slurry that hardens upon curing. Cement materials include hydraulic cements, gypsum, lime, and the like. Adjuvants and fillers include sand, clay, soil, fly ash, calcium carbonate, aggregate, air entrainment agents, colorant agents and so forth.

Hydraulic cement undergoes a hydration reaction in the presence of a sufficient quantity of water that produces the final hardened product. The following are two typical hydration reactions:

$$Ca_3Al_2O_6 + 6H_2O \rightarrow Ca_3Al_2(OH);$$

$$Ca_3SiO_5 + (x+1)H_2O \rightarrow Ca_2SiO_4 \cdot xH_2O + Ca(OH)_2$$

A particular hydraulic cement for use in the invention is Portland cement, for example, Portland cement type I. A cement-containing composition may also include lime (calcium oxide) which is itself also a hydraulic cement.

Fly ash may be used as a partial replacement for Portland cement in concrete construction. The proportion of Portland cement replaced by fly ash usually does not exceed about 20 wt % in order to avoid significant reduction in the compressive strength of a cured concrete. Fly ash components of cement-containing mixtures of the invention can be either C-type or F-type fly ash. Suitable types of useful fly ash are described in the Shulman U.S. Pat. No. 5,580,378 and in the Malloy et al U.S. Pat. No. 6,669,773. It will be understood that fly ash is an optional component of the cement-containing material and that the cement-containing material may be free of such fly ash.

Sand is frequently used to expand the volume of cement-containing mixtures. Sand used in the cement-containing mixtures of the present invention includes play sand whether from beach or river sources, and silica sand. Clay is a suitable alternative for sand in cement-containing materials.

Soil is an inexpensive alternative filler material to refined or purified materials, such as many forms of sand or clay. The soil may be obtained, for example, from the ground in the vicinity of the facility used to prepare bricks. The soil may comprise at least one mineral selected from sand, silt and clay. The soil may include materials, such as cinder, caliche, shale, laterite, and waste materials including dirty and poorly graded sands from gravel pits.

Fillers may include particles of larger size than sand. The particle size of such fillers may be, at least 2 mm, for example, from 3 to 5 mm. Such fillers include gravel, stone, pebbles, rocks, crushed rocks, crushed concrete slabs and crushed bricks. The bricks which may be crushed may be made from clay or concrete.

The weight ratio of cement to fillers in the cement-containing material may be at least 1:10, for example, from 1:10 to 5:1, for example, from 1:10 to 2:5. At least 90 wt % of the cement-containing material may be, for example, a mixture of (1) a hydraulic cement, such as Portland cement, (2) gravel and (3) sand or soil.

The thermoplastic material suitable for making bricks may be a polymeric, hydrocarbon-containing material, which, upon heating, is capable of softening or melting and then, upon cooling, is capable of binding particles of cement-containing material. This binding may take place in a hot press molding process. Examples of such thermoplastic materials include HDPE, polyethylene terephthalate (PET), polypropylene, low density polyethylene (LDPE), and mixtures of these materials. HDPE is a particularly preferred thermoplastic material. For example, HDPE melts at about 135° C., whereas PET melts at about 280-300° C. Consequently, HPDE is easier to process in a hot press than PET. HDPE also has a higher strength than LDPE.

It is preferred that thermoplastic material is a post consumer plastic material. A post consumer plastic material is a plastic material recovered from plastic-containing consumer materials, such as discarded containers.

When HDPE is used as a source of thermoplastic material, bricks produced by the present hot press process, may include one or more plastic materials other than HDPE or these bricks may be essentially free of detectable quantities of plastic materials other than HDPE. For example, these bricks may comprise 10 wt % or less, for example 5 wt % or less, for example, 2 wt % or less, of a plastic material other than HDPE, based on the weight of the HDPE in the bricks. Examples of such plastic materials include polystyrene, polyester (e.g., PET), low density polyethylene, polypropylene, polyacrylic polymers, polyacrylamide, polyacrylimide, polyvinyl chloride and the like. The plastic material may be either (1) already present in the source of HDPE, e.g., as an impurity, or (2) added as a separate component of the mixture of cement-containing material and HDPE.

Prior to molding, plastic particles may be mixed with cement-containing material. The plastic particles may be prepared by shredding or grinding sources of one or more plastic materials, such as discarded HDPE containers, such as milk jugs. The plastic particles may be in the form of flakes of less than 10 mm in size. These flakes by be directly blended with a cement-containing material. Another option is to extrude thermoplastic particles, such as flakes, into pellets. These pellets may have a uniform size, for example, with a size of less than 10 mm. These pellets may then be mixed with a cement-containing material.

The mixture of cement-containing material, thermoplastic and, optionally, other additives may be placed in a mold. While in the mold, the mixture may be compressed and heated. A sufficient pressure and temperature inside the mold is maintained for a sufficient time to cause thermoplastic material to melt or soften and form a matrix, which binds the components of the brick.

HDPE, in pure form, prior to consumer use, may have a density of for example, at least 0.93 g/cc, for example, from 0.95 to 0.97 g/cc. However, the measured density of post consumer HDPE may be slightly less than, as-synthesized, pre consumer HDPE. The HDPE containing bricks described herein may have a density of, for example, from 1.1 to 1.7 g/cc.

To facilitate rapid softening and melting of thermoplastic in a mold, the temperature of the mold may be maintained at a temperature well above, for example, 50° C. above, the melting point of the thermoplastic for a time sufficient for heat to be transferred into the mold to sufficiently soften and melt the thermoplastic. The melting point of HDPE is about 135° C. For example, the walls of the mold may be heated to a temperature of from 200 to 300° C. for a time of from 5 to 15 minutes, when HDPE is used as a thermoplastic material.

Then after heating, the brick may be permitted to cool in the mold until it is sufficiently cool and strong enough to be removed from the mold. After the brick is removed from the mold, the surface of the brick may be contacted with water, for example, by spraying, to cure cement-containing material on the surface of the brick, thereby hardening the surface of the brick.

Figure 2:
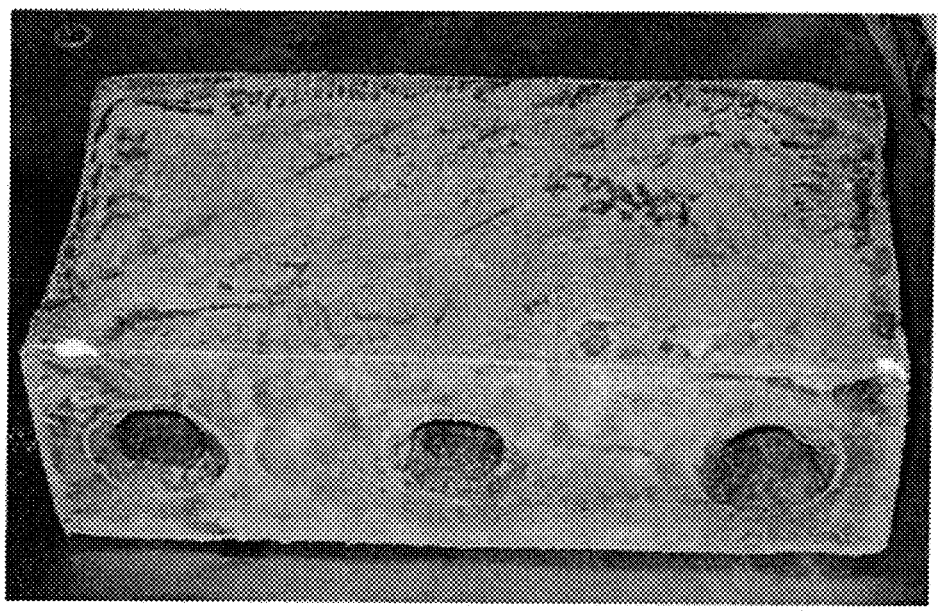
FIG. 2 is a photograph of a brick according to the present invention.

The mold used to make and shape the brick may include structure which produces a brick with void spaces. For example, such a mold is shown in FIG. 1. The cover 100 fits over the rectangular mold body 105. The cover 100 is equipped with three protruding cylindrical members 110, 115 and 120. After an appropriate mixture including thermoplastic material and cement-containing material is placed in the mold body 105, the cover 100 is pressed down on the mold body 105. The cylindrical members 110, 115 and 120 displace mixture in the mold body 105. FIG. 1 also shows a brick 125 produced with the mold body 105 and cover 100. The void spaces 130, 135 and 140 correspond to the void spaces created in the mold by virtue of cylindrical members 110, 115 and 120. These void spaces are also shown in FIG. 2, which is a side view photograph of a brick prepared in a mold of the type shown in FIG. 1.

EXAMPLE 1

Post consumer HDPE materials (water, milk, juice containers and others) were shredded into flakes of 6 mm in size. These flakes may be directly mixed with a cement-containing material to make bricks. However, in the present example, these flakes were first converted into uniform pellets in the size of 3-5 mm with a density of 0.92 g/cc by means of melt extrusion. The bricks were made by mixing the amount of cement-containing material and post consumer HDPE pellets, as shown in Table 1. The cement-containing material was composed of 20 wt % cement, 43 wt % white sand and 37 wt % gravel. The gravel was in the form of small stones having a size of 3-5 mm. The dry mixture of HDPE and cement-containing material was put in a mold as shown in FIG. 1, and put in a hot press operating at a temperature of 240-260° C. for 10 minutes pressing time. The mold body 105 had a width (i.e. height) of 100 mm, a length of 200 mm and a depth of 70 mm. The mold was then taken out of the press and let cool for several minutes. The molded brick was then taken out of the mold. For comparative purposes, a brick was made from 100% cement-containing material (no HDPE). This brick was made by the same method used to prepare the HDPE containing bricks, except that the mold was not heated. FIG. 2 shows photograph of a representative brick product containing HDPE.

TABLE 1

Composition of Cement-Containing/HDPE Bricks.

| Sample Number | Weight % Cement-Containing Material/HDPE | Total Weight (g) |
| --- | --- | --- |
| 1 | 0/100 | 715.3 |
| 2 | 20/80 | 1032.8 |
| 3 | 35/65 | 1140 |
| 4 | 45/55 | 1232.9 |
| 5 | 65/35 | 1591.4 |
| 6 | 100/0 | 2430 |

The foregoing examples have been provided for the purpose of explanation and should not be construed as limiting the present invention. While the present invention has been described with reference to an exemplary embodiment, changes may be made within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed:

1. A building brick comprising a cement-containing material bound in a matrix of thermoplastic material, wherein said brick comprises at least 35 wt % of thermoplastic material and at least 20 wt % of said cement-containing material, wherein internal regions of said brick comprise unhardened cement-containing material which has not been hardened by reaction with water, wherein the surface of said brick comprises hardened cement-containing material which has been hardened and cured by reaction with water.

2. The building brick of claim 1, wherein said thermoplastic material comprises HDPE.

3. The building brick of claim 1, wherein said brick comprises no more than 10 wt % of a plastic material, which is not HDPE, based on the weight of HPDE in the brick.

4. The building brick of claim 3, wherein the HDPE is a post consumer plastic material.

5. The building brick of claim 1, wherein at least 90 wt % of said cement-containing material is a three component of mixture of (1) hydraulic cement, (2) gravel and (3) sand or soil.

6. The building brick of claim 1, which is prepared by blending a dry mixture of said cement-containing material and said thermoplastic material, placing said dry mixture in a mold, applying pressure to said mold to compress said mixture while maintaining the temperature of the mixture at a temperature sufficient to melt or soften said thermoplastic material and bind the dry cement-containing material in a matrix of thermoplastic material in the form of a brick, removing the brick from the mold, and spraying water on the surface of the brick to cause cement-containing material on the surface of the brick to harden.

7. The building brick of claim 1, wherein said thermoplastic material is post consumer HDPE materials shredded into flakes of 6 mm in size.

8. The building brick of claim 1, wherein said thermoplastic material is post consumer HDPE pellets.

9. The building brick of claim 8, wherein said post consumer HDPE pellets are uniform pellets with a size of 3-5 mm and a density of 0.92 g/cc.

10. The building brick of claim 8, wherein said cement-containing material is composed of 20 wt % cement, 43 wt % white sand and 37 wt % gravel.

11. The building brick of claim 10, wherein said gravel has a size of 3-5 mm.

12. The building brick of claim 1, wherein said cement-containing material is 35 wt % and said thermoplastic material 65 wt %.

13. The building brick of claim 1, wherein said cement-containing material is 45 wt % and said thermoplastic material 55 wt %.

14. The building brick of claim 1, wherein said cement-containing material is 55 wt % and said thermoplastic material 45 wt %.

15. The building brick of claim 1, wherein said brick comprises 5 wt % or less of a plastic material other than HDPE, based on the weight of HPDE in the brick.

16. The building brick of claim 15, wherein said plastic material includes polystyrene, polyester, low density polyethylene, polypropylene, polyacrylic polymers, polyacrylamide, polyacrylimide, and polyvinyl chloride.

17. The building brick of claim 1, wherein said brick comprises 2 wt % or less of a plastic material other than HDPE, based on the weight of HPDE in the brick.

18. The building brick of claim 1, wherein said cement-containing material includes fillers in a weight ratio of cement to said fillers of at least 1:10.

19. The building brick of claim 18, wherein said fillers comprise gravel and sand or soil.

\* \* \* \* \*